UNITED STATES PATENT OFFICE.

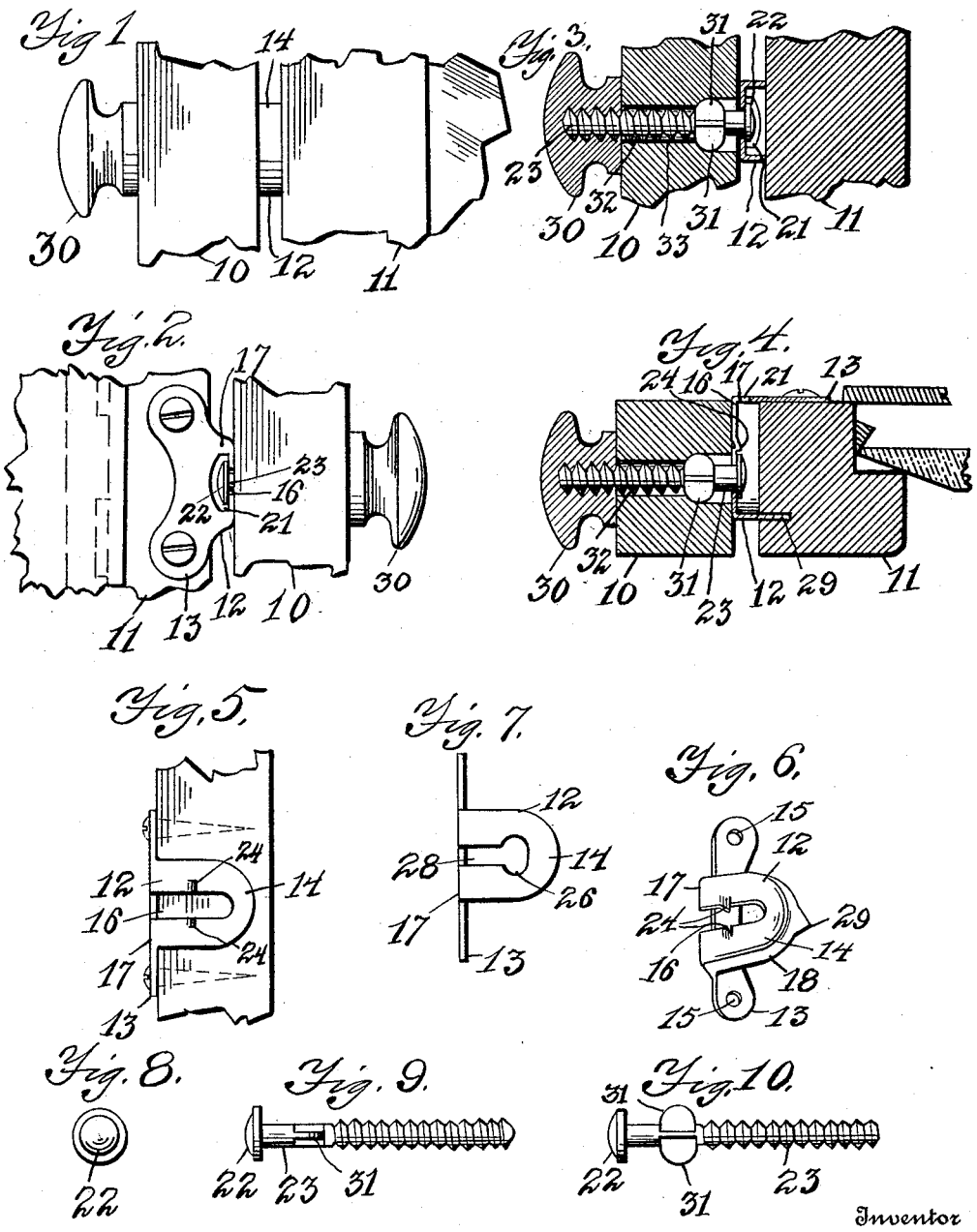

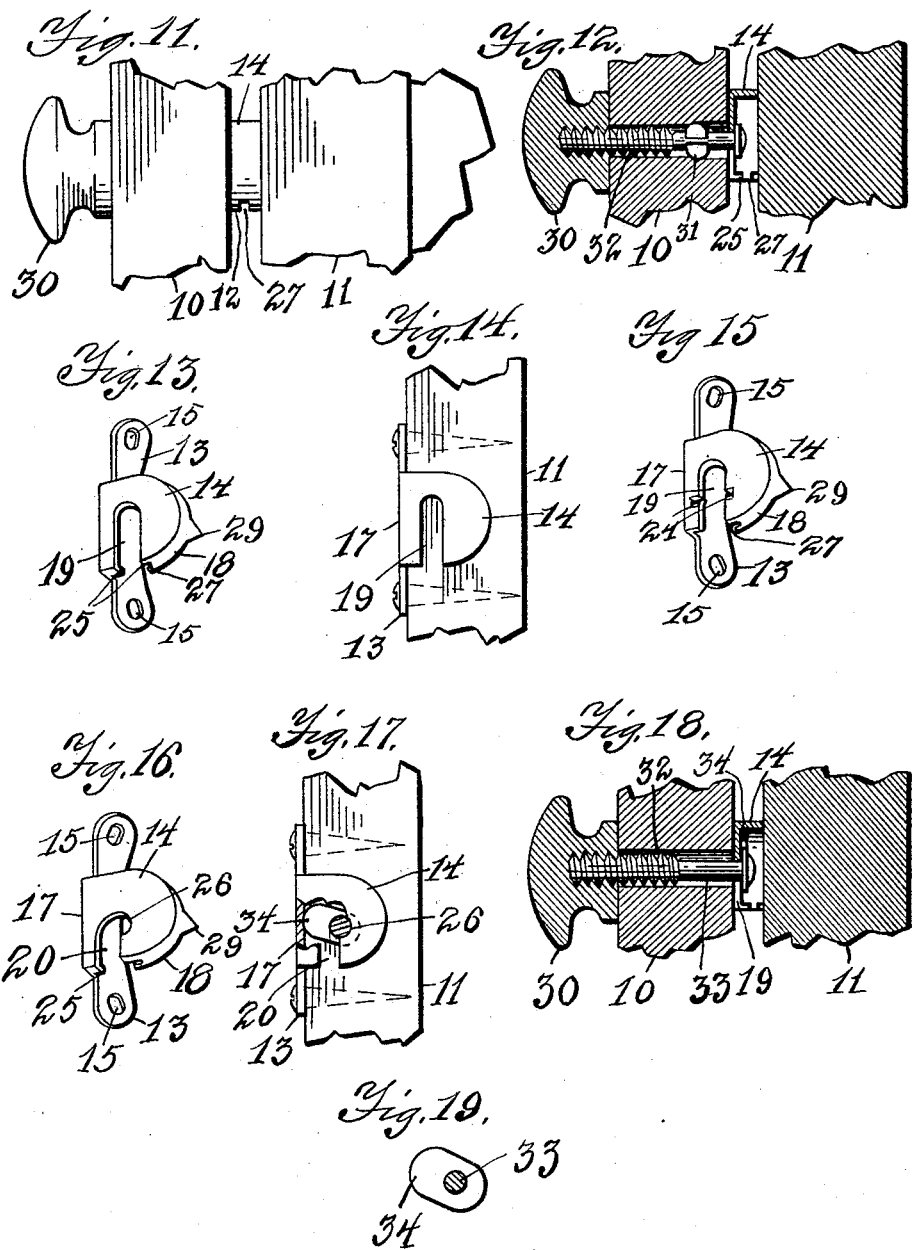

ALFRED A. ANDERSON, OF JAMESTOWN, NEW YORK.

PIVOTAL SUPPORT FOR MIRRORS.

1,116,782. Specification of Letters Patent. Patented Nov. 10, 1914.

Application filed February 13, 1914. Serial No. 818,491.

*To all whom it may concern:*

Be it known that I, ALFRED A. ANDERSON, a citizen of the United States, residing at the city of Jamestown, in the county of Chautauqua and State of New York, have invented certain new and useful Improvements in Pivotal Supports for Mirrors, of which the following, taken in connection with the accompanying drawings, is a specification.

The invention relates to devices for pivotally hanging mirrors on supporting standards or frames on dressers, chiffonniers and similar pieces of furniture, so that the mirrors may be turned and held at any desired angle; and the object of the improvement is to provide a fastening for hanging each side of a mirror on the supporting standards which is easily adjustable so that the mirror frame may be rotated freely, or be tightened to hold the mirror frame by frictional tension at any desired angle so firmly that the frictional hold can not be loosened by turning the mirror; and the invention consists in the novel features and combinations hereinafter set forth and claimed.

In the drawings, Figure 1 is a front elevation of a portion of the mirror frame and one of its supporting standards, showing the pivotal attaching device; and Fig. 2 is a rear elevation of the same, showing the entrance slot on the rear side of the holding clip; and Fig. 3 is a vertical sectional view of said parts, showing the preferred manner of holding the screw from turning, showing the arrangement of the different parts; and Fig. 4 is a crosswise sectional view of the parts lengthwise of the slot, showing the arrangement of the parts. Fig. 5 is a rear elevation of a portion of the mirror frame, showing the edge adjacent the supporting standard with the holding clip attached thereto and having the preferred rear form of slot and struck up humps for holding the head of the attaching screw within the holding clip; and Fig. 6 is a perspective view of said holding clip detached from the mirror frame; and Fig. 7 is a modification of the holding clip with the rear entrance slot, showing an enlarged end for said slot in place of the struck up humps for holding the head of the attaching screw within said slot. Fig. 8 is an elevation of the preferred form of the screw-head; and Figs. 9 and 10 show side elevations of the screw with the double fins struck up on the same to prevent the turning of the screw in the supporting standard. Fig. 11 is a front elevation of a portion of the mirror frame and the supporting standard, showing the pivotal attaching device with the entrance slot on the under side of the holding clip; and Fig. 12 is a vertical sectional view of said parts showing the holding clip in section lengthwise of the slot with the lips at the mouth of the slot for retaining the head of the screw therein; and Fig. 13 is a perspective view of said clip detached from the mirror frame; and Fig. 14 is an edgewise view of the mirror frame with the holding clip attached. Fig. 15 is a perspective view of the holding clip with the entrance slot on the under side and having struck up humps for holding the screw-head within said holding clip. Fig. 16 is a perspective view of a further modification of the holding clip with the entrance slot on the under side, having lips at the mouth of said entrance slot and a sidewise enlargement on the opposite side of the inner end of said slot from the attaching portion of said holding clip for attaching to the rear side of the mirror frame; and Fig. 17 is an elevation of the edge of the mirror frame with the holding clip, as shown in Fig. 16, attached thereto; and Fig. 18 is a vertical section view of the holding clip as shown in Figs. 16 and 17 with an attaching screw without the struck up fins to prevent it from turning in the standard, it having a projection on the head to prevent its turning in the holding clip; and Fig. 19 is a plan view of the underside of the screw-head as shown in Fig. 17, with said head extending to one side of the shaft of the screw so as to form a cam-shaped sidewise extension to lock against the inner side of the slot 17.

Like numerals of reference refer to corresponding parts in the several views.

The numeral 10 designates the mirror supporting standard, and the numeral 11 the mirror frame.

The clip 12 is preferably formed with a portion 13 of the sheet metal plate at right angles to the cup-shaped portion 14, the part 13 being provided with holes 15 to receive the attaching screws, by means of which the holding clip 12 is secured to the rear side of the mirror frame 11. The cup-shaped portion 14 being bent at right angles to the attaching plate portion 13 of the holding clip 12, has an open ended slot 16 which is preferably entered from the rear side through the rear wall 17 of said cup-shaped portion, which rear wall 17 is an extension in the plane of the vertical attaching plate portion 13. The open ended slot may, however, be entered from the lower side of the cup-shaped portion through the wall 18 which forms the side of the cup, as shown at 19 and 20 in the modified forms in Figs. 11–18. The mouth 21 of the preferred form 16 of the open ended slot is extended in to each side wall of the mouth of said slot a sufficient distance and engaged so as to admit the head 22 of the attaching screw 23. In order to prevent the accidental disengagement of the clip 15 from the screw 23, the side walls of the slot 16 are so constructed at or near the mouth of the slot as to prevent the escape of the screw-head 22 from the slot. This may be accomplished by means of the struck up humps 24 in the side walls of the slot 16, or the mouth of the slot may be formed with lips 25. Any obstruction on or in said side walls would attain applicant's purpose which would form a recess to hold the screw-head within the inner end of the slot and out of alinement with the mouth thus, for example, the sidewise enlargement 26 of the inner end of the slot, as shown in Figs. 7 and 16 and 17, would attain applicant's purpose though not in so convenient a manner as the humps 24 or lips 25. Where the lips 25 are employed, the sidewise enlargements 27 for the admission of the screw-head 22 must also be provided, the same as at 21 for slot 16. In the modification of the rearwardly opening slot 28, the sidewise enlargement 26 of the inner end of the slot may be made on both sides to permit the use of the same die for right or left holding clips. The screw 23 will, of course, rest in the lower enlargement 26. A spur 29 is preferably provided on the flange 18 and located on the opposite side of the cup-shaped portion 14 from the attaching part 13. Said spur 29 is driven into the mirror frame 11 so as to firmly hold the holding clip 12 in position while the attaching screws are being inserted, and when the attaching screws are thus inserted the spur 29 greatly aids in holding the clip 12 in position upon the frame 11.

In order that the screw 23 should draw true and not turn in the supporting standard 10 and permit the attachment of a tightening knob 30 on the outer end of the screw, fins 31 are struck up on the opposite sides of the screw by means of a suitable die, which fins are driven into the wood in the opposite walls formed by the bored hole 32 in the standard 10. The fins 26 prevent the turning of the screw and permit the knob 30 to be turned to any degree of tightness to frictionally hold the mirror 11 firmly in position. The screws 23 are driven into the standard 10 a sufficient distance to hold the mirror frame firmly in position by the head 22. The draw of the holding clips when the screws are released withdraws the fins 31 and the screw 23 slightly in the standard 10 sufficient to permit of the free rotation of the mirror upon the screw 23 through the engagement of the holding clip 12.

The preferred form of the attachment is assembled by inserting the screw 23 through the hole 32 until the fins 31 strike the mouth of the hole, after which the screw is driven to the required depth which is desired for the fins 31, a slight tap on the head of the screw being all that is necessary. The knob 30 is then turned onto the threaded end of the screw. The holding clip as shown in Figs. 1–6 is attached to the edge of the mirror frame 11 by driving the projection 29 into the edge of said mirror, thereby holding the clip in place for the insertion of the attaching screws. The mirror is then hung upon the screws 23 in the standards 10 by inserting the head 22 through the mouths 21 of the slot 16 until said heads 22 pass the projection which prevents the escape of the head from the slot. It is then apparent that the knob 30 can be loosened or tightened as desired in its frictional hold upon the mirror frame. The modification shown in Figs. 11–15 is used in practically the same manner except that the slot is arranged from the under side instead of the rear side.

In the modification shown in Figs. 16–19, the mouth of the open ended slot 20 extends to the under side of the cup-shaped portion and has the sidewise enlargement 26 as hereinbefore described. A screw 33 may be used without the sidewise extending fins 31 but having a sidewise extending or cam-shaped head 34 in its relation to the shaft of the screw 33. The screws 33 are inserted through the holes 32 in the standard 10 and the knob 30 is screwed thereon. The holding clip having the sidewise extension 26 is attached to the edge of the mirror 11. The mirror is then hung upon the head of the screw 33 and the knob 30 is turned thereby turning the screw 33 so that the enlarged or cam-shaped head 34 is pressed against the inner side of the flat rear wall 17 as shown in Fig. 17, thereby pressing the shaft of the screw 33 firmly into the sidewise enlargement 26 of the slot 20 and locking the screw 33 against turning so that the knob 30 can be turned upon the screw 33 thereby tightening the frictional hold of the head of the screw upon the holding clip and giving the desired tensional hold for the mirror frame 11.

One of the main points in the construction of this simple fastening device for pivotally hanging or supporting the mirror frame on the supporting standard is the possibility of positively obtaining a frictional tension of the holding device upon the edge of the mirror frame so that the mirror frame may be turned backward or forward and will stay at the desired position, or may be rotated freely, which may be attained without loosening the hold of the screw or changing the tension of said screw upon the mirror frame, since the screw is held rigidly by the fins 31 against rotation, consequently any oscillation of the mirror frame 11 will not affect the anchorage of the screw.

I claim as new:

1. In a device of the type set forth, a holding clip having a substantially cup-shaped part provided with a slot which extends through the bounding flange thereof, means whereby the clip may be attached to a mirror frame, a screw having its head insertible in said slot and being for attachment to the mirror frame support, means to prevent rotation of the screw in said support, and means to draw the head of the screw against the body of the cup-shaped part.

2. In a device of the type set forth, a holding clip having a plate formed with screw holes to enable same to be attached to the mirror frame, said plate having a side extension, a cup-like part connected to the side extension at right angles thereto and having a slot which extends through the bounding flange thereof, a screw having its head insertible in said slot and being for attachment to the mirror frame support, means to hold the screw against rotation in the support, and means to draw the head of the screw against the body of the cup-shaped part.

3. In a device of the type set forth, a holding clip having a substantially cup-shaped part provided with a slot which extends through the bounding flange thereof, means whereby the clip may be attached to a mirror frame, a screw having its head insertible in said slot and being for attachment to the mirror frame support, fins extending outwardly from the screw to bite into the walls of the standard which surround said screw, and means to draw the head of the screw against the body of the cup-shaped part.

4. In a device of the type set forth, a plate, a cup-shaped slotted member connected to the plate and extending at right angles thereto, said plate being for attachment to the rear face of the mirror frame, a spur on said member extending parallel to the plate and being for engagement in the outer side face of the mirror frame, a screw having its head insertible in said slotted member, means to hold the screw against rotation in the mirror frame support, and means to draw the screw head into a recess in said cup-shaped member out of alinement with the slot and against the body of said member.

5. In a device of the class described, a cup-shaped holding clip having a slot therein with a sidewise extension and means for attaching said holding clip to the edge of the mirror frame, a screw having a head insertible in said slot and being adapted to extend through a supporting standard for said mirror, a knob screwed onto the threaded outer end of said screw to tighten the same on said standard and holding clip, fins struck out on said screw to hold in the walls of the hole through said standard and prevent said screw from turning therein, and a head on said screw having straight sides with projecting ends to lock against the inner side of said holding clip and press said screw against the wall of said sidewise extension of said slot.

In testimony whereof I have affixed my signature in the presence of two witnesses.

ALFRED A. ANDERSON.

Witnesses:
H. A. SANDBERG,
HAROLD FORSBERG.

---

Copies of this patent may be obtained for five cents each, by addressing the "Commissioner of Patents, Washington, D. C."